United States Patent Office 3,005,799
Patented Oct. 24, 1961

3,005,799
POLYMERIZATION OF FORMALDEHYDE
Kuno Wagner, Leverkusen, Germany, assignor to Farbenfabriken Bayer Aktiengesellschaft, Leverkusen, Germany, a corporation of Germany
No Drawing. Filed May 18, 1959, Ser. No. 813,629
14 Claims. (Cl. 260—67)

The present invention relates to the polymerization of formaldehyde.

It is known that formaldehyde can easily be polymerized in the presence or absence of catalysts when traces of water are present. Depending on concentration conditions, the temperature, the nature and the quantity of the catalyst and the water content of the formaldehyde used, the polymerization either produces crystalline compounds of low molecular weight, such as for example $\alpha$-trioxy-methylene, or more usually mixtures of homologous polymeric polyoxymethylenes of more or less high molecular weight. The polyoxymethylenes of high molecular weight, the so-called Eu-polyoxymethylenes, are distinguished by their thermoplastic-elastic behaviour and also by their film-forming and fibre-forming powers at elevated temperature. This plastically elastic region is at 160–200° C. and films and stretchable elastic fibres have already been produced from these polymerization products. (See for example H. Staudinger, Die hochmolekularen org. Verbindungen, J. Springer-Verlag (1932), "Das Polyoxymethylen, ein Modell der Cellulose," page 261).

The Eu-polyoxymethylenes prepared by known processes are usually powdery, amorphous to vitreous substances. It has been possible under special conditions also to obtain polyoxymethylenes which show a crystal structure in a Debeye-Scherrer diagram.

The present invention is concerned with a process by which it is possible for polyoxymethylenes of high molecular weight and having valuable properties to be produced in an extremely simple and reproducible manner with a very good yield, by polymerizing formaldehyde on metal catalysts or on metal oxides, metal hydroxides and/or hydrated metal oxides or derivatives of these compounds.

In this way, crystalline polyoxymethylenes of high molecural weight are obtained without any admixture of amorphous or vitreous Eu-polyoxymethylenes. The products obtained are more especially distinguished from the prior known polymerization products by their high degree of crystallization and by their improved resistance to hydrolytic and thermal stressing. They have a lower vapor pressure of formaldehyde at elevated temperature and are consequently more stable by comparison with the fibrous sublimation products obtainable in small yields from $\beta$-polyoxymethylenes.

For carrying out the process of the present invention, gaseous or liquid substantially anhydrous formaldehyde is required which should contain as little water as possible, preferably less then 0.5 percent by weight, especially about 0.1 to 0.01 percent by weight. Gaseous formaldehyde can for example be obtained by thermal decomposition of paraformaldehyde and also by decomposition of polyoxymethylene dihydrates of relatively high molecular weight, such for example as those of $\alpha$-polyoxymethylene, as well as by pyrolysis of polyoxymethylene dimethylethers or polyoxymethylene diacetates, or by decomposing the semi-ethers or semi-acetates of polyoxymethylenes. Excessive quantities of water are eliminated from the gas stream by freezing out or by polymerizing the formaldehyde with water in relatively long transfer conduits, prior to entering the reaction chamber, to form polyoxymethylene dihydrates of relatively low molecular weight. The gaseous formaldehyde can also be liquefied before it is polymerized and thereafter be evaporated again, in order to obtain a higher degree of purity. Finally, gaseous formaldehyde can be liquefied or solidified in the reaction vessel beneath the catalysts and thereafter can be slowly evaporated.

According to one embodiment of the invention, high molecular weight addition polymers of formaldehyde are obtained by contacting substantially anhydrous formaldehyde with a metal catalyst which is an aluminium catalyst or a catalyst containing metallic aluminium. Besides aluminium catalysts there may be used aluminium alloy catalysts, as for instance alloys of aluminium with Cu, Ag, Au, Be, Mg, Ca, Sr, Ba, Zn, Cd, Hg, Si, Ti, Zr, Ge, Sn, Pb, V, Nb, Ta, Sb, Bi, Cr, Mo, W, Mn, Fe, Ni, Cr, alkaline metals such as Li or other metals. These alloys should in general contain 30 to 99 and preferably 80 to 99 percent by weight of aluminium.

The polymerization temperature can fluctuate within very wide limits, the preferred temperature range being between $-80$ and $+70°$ C. and especially between $-20$ and $+35°$ C.

The following alloys containing aluminium have proved to be particularly satisfactory:

Aluminium-magnesium alloys
Aluminium cobalt alloys
Aluminium copper alloys
Aluminium-copper-manganese alloys, for example alloys with 2.5–5 percent copper, 0.5–2 percent magnesium, 0.5–1.2 percent manganese and 0.2 percent silicon
Aluminium-silicon alloys, containing 12–14 percent silicon
Aluminium-zinc alloys, containing 0.5 percent iron, 0.5 percent silicon, 0.08 percent lithium
Aluminium-magnesium-titanium alloys, and also alloys containing aluminium, cadmium, zinc, calcium and lithium as well as Devarda's alloy. All amalgams of the said aluminium alloys may be used.

It is usually necessary to activate the aluminium or the said aluminium alloys. By the term activated aluminium or activated aluminium alloys are used herein, there are to be understood aluminium or aluminium alloys which are capable of decomposing water under evolution of hydrogen or to form alcoholates when reacting them with lower monohydric alcohols. Such activated aluminium or aluminium alloys are well known in the art. The activation may for instance be achieved by surface amalgamation with solutions of salts of mercury, such for example as with mercuric chloride, mercury cyanides or complex compounds of mercury salts. The activation and amalgamation in traces with $HgCl_2$ has proved to be particularly useful. Even with sparing amalgamation of aluminium or said aluminium alloys, it is possible to obtain highly effective catalysts for the polymerization of formaldehyde. The activated aluminium or aluminium alloys are subject to rapid oxidation in moist air with production of moss-like exerescenses of oxide. The amalgamated metals or metal alloys can also be covered with aluminium oxide nuclei by storing for a short time in moist air and can be introduced in this form as metal catalysts into the polymerization chambers. The activation may furthermore be enhanced by degreasing, etching with halogenes (chlorine, bromine) or inorganic or organic acids, treatment with solutions of metal salts (chlorides of Cd, Co, Cr, Ti, boron complex compounds of these salts) or with hydrogen peroxide before the amalgamation is effected.

For carrying through the polymerization, the substantially anhydrous formaldehyde is contacted in gaseous or liquid form with the disclosed catalysts, preferably in the absence of solvents, although the solvents disclosed below may also be present. The arrangement, size and quantity of the metal catalysts, in the reaction vessel are variable. It is for example possible to use aluminium chips, but it is more advantageous to use large contact surfaces, from which the fibre-like crystalline polyoxymethylenes of high molecular weight formed during polymerization can be removed very easily. Smooth aluminium surfaces can for example be arranged in honeycomb formation on supports which may be cooled. Aluminium tubes through which a coolant flows can be employed, and it is also possible to utilise aluminium or aluminium alloys for manufacturing reaction chambers several of which may be connected in series. In addition, these are traversed with aluminium surfaces which can be cooled and which are arranged in honeycomb formation. The polymerization can also be effected on aluminium rollers with built-in scrapers, as well as conveyor belts which are capable of being cooled and which are lined with aluminium foils. The polymer is scraped off these belts at the requisite time and the metal catalyst passes afresh into the reaction chambers, if desired with continuous activation. Atmospheric pressure is normally employed, although the pressure may be subatmospheric or superatmospheric.

The flow velocity into the reaction chambers of the formaldehyde, if necessary in addition to an inert carrier gas, can vary and depends on the number of such chambers and the surfaces of the metal catalysts used. Formaldehyde which has not polymerized can be returned to the reaction chambers or be used for the production of aqueous formaldehyde solutions.

As the polymerization of the formaldehyde takes place very quickly, monomeric formaldehyde preferentially seems to be deposited on the forming crystallites of high molecular weight polyoxymethylene which are visible to the naked eye. Even with a completely covered contact surface, there is obtained a progressive growth of the crystallite to fibres which are arranged in cluster formation and the main quantities of which have lengths of more than 5 cm.

The products obtained by the process of the invention have great advantages over other comparable polymerization products. Crystalline fibrous polyoxymethylenes of high molecular weight are obtained, these being free from amorphous and vitreous polymerization products. They also do not contain any traces of low molecular components of polyoxymethylene dihydrates, which are always present in pulverous polymerization products. The fibrous polyoxymethylenes have a substantially lower vapor pressure of formaldehyde at temperatures in the region of 160° C. than products prepared by known processes.

The softening temperatures are about 10° C. higher than those of the known pulverous or vitreous polyoxymethylenes of high molecular weight. The products are thermoplastic and melt sharply at 180° C. One technical advantage is that these products can be made in the absence of solvents, this obviating the necessity of recovering solvents. The new polymers can be acetylated with acetic acid anhydride by known processes or alkylated with alcohol in known manner.

According to a further embodiment of the invention, the polymerization of formaldehyde is effected by contacting substantially anhydrous formaldehyde with catalysts comprising aluminium oxides, aluminium hydroxides or hydrated aluminium oxides.

Suitable catalysts are, for instance, gamma- $Al_2O_3$, $Al_2O_3 \cdot H_2O$, $Al_2O_3 \cdot 2H_2O$, $Al_2O_3 \cdot 3H_2O$, aluminium-hydroxide. Furthermore, there come into question catalysts which in addition to the aforementioned compounds contain oxides, hydroxides or oxyhydrates of further metals, such as alkaline earth metals, magnesium, beryllium, zinc, rare earth metals and other heavy metals, such as cadmium, titanium, vanadium, chromium, furthermore oxides of silicon, hydrolized silicic acid esters, hydrolized inorganodichlorosilanes. In these mixed oxides, hydroxides and hydrated oxides, aluminium should preferably be present in amounts of 30 to 99 percent by weight, as calculated on the total metals. By way of example, there may be cited the following catalysts:

$Al_2O_3 \cdot MgO$, $Al_2O_3 \cdot BeO$, $Al_2O_3 \cdot ZnO$, $Al_2O_3 \cdot FeO$ or the corresponding hydrolized or hydrated oxides.

These compounds may be obtained by methods which are known per se. It is, for instance, possible to prepare aqueous solutions of aluminium salts or of aluminium salts and of salts of further metals and to precipitate the salts by addition of alkaline agents, such as sodium carbonate or ammonia. After filtering off, the precipitate is washed with water and dried at temperatures of about 20 to 100° C. The dried precipitate may be further heated to temperatures of about 100 to 1000° C., preferably 100 to 300° C. in order to transform the hydroxides or hydrated oxides at least partially into the corresponding oxides.

Particularly valuable are those oxides, hydroxides and hydrated oxides which are obtained for example from aluminium or from the above cited aluminium alloys amalgamated with mercury salts by action of moisture in the manner disclosed above; the following aluminium alloys are mentioned as examples of those suitable for the production of such metal compounds: alloys of aluminium with Cu, Mg, Zn, Cd, Be, Sc, Ga, Y, Co, Mo, W, Ti, Ba, Nb, Ta, Cr, Ni, Sn, Fe and the like. It is also possible to use those oxygen containing compounds which are obtained for example by hydrolysis of aluminium trichloride, or complex salts of the type $Na_3(AlCl_6)$, aluminium carbide, organic aluminium compounds, such as aluminium oxalates, aluminium acetates, aluminium acetyl acetonates, aluminium borohydride, lithium aluminium hydride and addition compounds of aluminium hydrides with $MgH_2$, $BH_3$, $ZnH_2$ and also of aluminium alcoholates and isocyanates. Finally, the said catalysts can also be obtained by hydrolysis of aluminium-nitrogen compounds, such for example as $Al(NH_2)_3$ or their derivatives or mixtures of these compounds with compounds of similar structure and containing titanium, cobalt and chromium. The catalysts used according to the invention are advantageously in finely divided form.

Advantageously, the polymerization of the gaseous or liquid formaldehyde is initiated with the catalysts in the presence of substantially anhydrous inert solvents. Examples of suitable solvents are hydrocarbons having 4 to 12 carbon atoms, such as butane, hexane, heptane, cyclohexane, benzene, toluene, xylene; chlorinated hydrocarbons, such as $CH_2Cl_2$, $CHCl_3$, $CCl_4$, ethylenechloride, chlorobenzene, dichlorobenzene; ethers, such as dimethylether, diethylether, dipropylether, dibutylether; dioxan; tetrahydrofuran esters of saturated carboxylic acids such as propylacetate, butylacetate.

As pointed out above, the polymerization temperature can fluctuate within wide limits, the preferred temperature range being between —80° and +70° C. and more especially between —30° and +25° C. If the polymerization takes place in the presence of solvents, the catalysts can be suspended in the solvents. If the polymerization is carried out in the absence of solvents, the catalysts are preferably fixed to porous supports or used in a fluidized bed. In carrying through the polymerization in inert solvents, these are usually applied in amounts of 2 to 50, preferably 5–20 parts by volume of solvent per 1 part by weight of formaldehyde, whereas the catalysts are usually applied in amounts of 0.5 to 10, preferably 1 to 5 parts by weight per 100 parts by weight of formaldehyde.

The products obtained by the process of the invention do not contain any fractions of polyoxymethylene dihydrates of low molecular weight. They show improved thermal stability by comparison with polymerization products which are produced with $BCl_3$ or tertiary amines. Since the catalysts of the present invention are capable of more strongly bonding the traces of water contained in the formaldehyde than, for example, is possible with tertiary bases, the breaking of the chains takes place slower and consequently higher molecular weights are obtained.

The catalysts admixed with the polyoxymethylenes of high molecular weight can be separated by suspension of the polymerization products for example in organic solvents because of their differences in density, but separation can also be effected by dissolving the polyoxymethylenes in suitable solvents. If the polymerization products are stabilized, the catalysts must not be removed and for example, after the conversion of the polymerization products into polyoxymethylene diacetates, they can remain as fillers in the products of high molecular weight. The polymers can be acetylated with acetic acid anhydride or alkylated with alcohols by known processes and be used for the manufacture of plastics.

In the following examples, the parts are parts by weight unless otherwise indicated.

Example 1

150 parts by weight of paraformaldehyde are thermally decomposed and the monomeric formaldehyde substantially freed from water. Residual water is removed by freezing out in two cooling traps cooled to −10 to −15° C. until only traces remain. The stream of formaldehyde thus purified enters a reaction vessel which is charged with 610 parts by weight of activated aluminium in the form of small aluminium plates (0.3 cm. x 2 cm. x 9 cm., or aluminium foils of about 0.01 cm. thickness). The reaction vessel is cooled to −12 to −15° C. The polymerization starts immediately with the formation of small crystal nuclei and the temperature in the reaction vessel rises after about 30 minutes. The internal temperature is kept at 10 to 30° C. by cooling. The polymerization and the strong growth of polyoxymethylene crystals can be followed directly with the naked eye. Fibres arranged in the form of tufts develop after a short time and continue to grow. The polymerization is completed in about 4 hours. The fibrous polyoxymethylenes of high molecular weight obtained in this way can easily be removed from the plates by shaking and stripping. They soften at 178 to 182° C. and melt sharply. By comparison with polyoxymethylenes in powder form, they have a higher stability since they give off formaldehyde substantially more slowly, for example, with a melted sample. Yield: 85 g. of fibrous polyoxymethylenes of high molecular weight; the calculated value, based on the formaldehyde actually passed through the reaction vessel (105 g.) is 81 percent of the theoretical. Formaldehyde which has not polymerized is transformed into a concentrated formaldehyde solution.

The aluminium which is used is activated in the following manner: the aluminium plates or foils are slightly amalgamated for about 5 to 10 minutes in a 0.1 percent ethereal $HgCl_2$ solution. The ether is decanted therefrom, and the plates finally washed with toluene. The amalgamated aluminium generally may contain only traces of mercury varying between about 0.001 to 1 percent by weight.

If the supply of formaldehyde into the reaction chamber is continued, the polymerization progresses in spite of a heavily covered contact surface. Over a period of a few hours, tufted fibres with a length of 5 to 10 cm. are obtained.

Example 2

The procedure followed is in accordance with Example 1, but instead of activated aluminium as catalyst, there is employed an aluminium alloy (98.5 percent Al, 0.9 percent Cu, 0.2 percent Fe, 0.3 percent Mn) amalgamated as in Example 1. By proceeding with the polymerization in the same way, fibres arranged as tufts are obtained having the same properties and are of the same length as those in Example 1.

Example 3

150 parts of paraformaldehyde are thermally decomposed and the monomeric formaldehyde substantially freed from water. Any remaining water is removed by freezing out in two cooling traps cooled to −10 to −15° C. until only traces are left. The formaldehyde stream purified in this way enters a reaction vessel containing 1200 parts by volume of toluene and 4 parts of an active hydrated aluminium oxide. The reaction medium is stirred at −10 to 5° C. Polymerization soon starts and polyoxymethylenes of high molecular weight separate out in colorless amorphous form.

After 4 hours, the polymerization is completed, the insoluble polymer is separated and freed from parts of the very finely divided aluminium oxide catalyst by taking up in toluene and vigorous stirring followed by decantation. A polyoxymethylene of high molecular weight which softens at 173 to 176° C. is obtained. Yield 70 g. This is 55 percent of the theoretical calculated on the formaldehyde (105 g.) actually conducted through the reaction vessel. Formaldehyde which has not polymerized is transformed into a concentrated formaldehyde solution.

The polymerization product may be acetylated in known manner by refluxing a mixture of 200 parts of polymerizate, 1200 parts of acetic acid anhydride, 2.5 parts of sodium acetate for 2 hours at 138° C., separating the reaction product by filtration, washing the reaction product with acetone and drying. Reaction products having a sharp melting point and softening between 172 and 174° C. are obtained.

The activated hydrated aluminium oxide is prepared as follows: aluminium sheets (0.2 x 2 x 8 cm.) are amalgamated with a 0.2 percent ethereal mercuric chloride solution, and, after removing the ether and adhering mercuric chloride, are subjected to the action of moist air. The hydrated oxides being formed are collected and used for the polymerization of the formaldehyde without further drying.

Example 4

The procedure of Example 3 is followed, however, there is used an aluminium oxide mixture which was obtained from an aluminium alloy containing:

0.5 percent of zinc
0.3 percent of iron
0.3 percent of manganese
0.5 percent of silicon and
0.5 percent of chromium The alloy is dissolved in concentrated sodium hydroxide solution in order to produce aluminium oxide mixture. The metal hydroxides are precipitated by addition of hydrochloric acid at pH 7.8, washed with water, dried in an air current and subsequently heated at 800° C. for half an hour. By polymerization of the formaldehyde under the conditions of Example 3, 60 parts of high molecular weight polyoxymethylene are obtained with 4 parts of a catalyst per 1200 parts by volume of toluene.

Example 5

The procedure described in Example 3 is followed, but using 10 parts of aluminium oxide (according to Brockmann). 64 parts of an amorphous polyoxymethylene of high molecular weight is obtained. Softening point: 169 to 175° C.

Example 6

The procedure described in Example 3 is followed, but a hydrated aluminium oxide is used. This is obtained by amalgamation of an aluminium alloy consisting of 95 percent of aluminium, 2.5 percent of copper, 0.3 percent of sodium, 1.2 percent of magnesium and 1 percent of zinc by the procedure of Example 1. A grey hydrate oxide which is not further dried is obtained and this is used for polymerizing formaldehyde under the conditions of Example 3. 75 grams of a polyoxymethylene of high molecular weight is obtained.

Example 7

The procedure described in Example 3 is followed, but using an aluminium hydroxy chloride (chlorine content 0.3 percent) prepared by hydrolysis of aluminium chloride in benzene by the addition of ether containing water. The polymerization is carried out as described in Example 3 and there is obtained a yield of 59 grams of polyoxymethylene of high molecular weight with a softening point of 166 to 172° C.

Example 8

The procedure of Example 1 is followed, however, there is used an aluminium alloy amalgamated as described in Example 1 which contains:

0.5 percent of zinc
0.3 percent of iron
0.5 percent of silicon
0.3 percent of manganese and
0.08 percent of lithium After the actviation as described in Example 1, an air stream of 85 percent relative humidity is passed through the polymerization vessel at 20° C. within 5 minutes, partial formation of aluminium oxyhydrate beginning to take place on the contact surfaces. Thereupon, formaldehyde is polymerized in the reaction vessel, whereby fibres of high molecular weight arranged as tufts are obtained.

What I claim is:

1. A process for producing polyoxymethylenes of high molecular weight comprising contacting substantially anhydrous monomeric formaldehyde at temperatures of about −80 to +70° C. with a polymerization catalyst selected from the group consisting of metallic aluminium, aluminium oxides, and aluminium hydroxides, thereby causing said monomeric formaldehyde to polymerize.

2. A process according to claim 1 wherein the polymerization catalyst is activated aluminium capable of decomposing water under hydrogen formation.

3. A process according to claim 1 wherein the polymerization catalyst is an activated aluminium alloy capable of decomposing water under hydrogen formation.

4. A process according to claim 1 wherein the polymerization catalyst is amalgamated aluminium.

5. A process according to claim 1 wherein the polymerization catalyst is an amalgamated aluminium alloy.

6. A process according to claim 1 in which the polymerization is carried through in the presence of an inert organic solvent.

7. Process of claim 1 wherein said catalyst is a hydrated aluminum oxide.

8. Process of claim 1 wherein said catalyst is a metal composition containing at least 30% by weight of aluminum.

9. Process of claim 1 wherein said catalyst is a mixed metal oxide, at least 30% by weight of the metal therein consisting of aluminum.

10. Process of claim 1 wherein said catalyst is a mixed metal hydroxide, at least 30% by weight of the metal therein consisting of aluminum.

11. Process of claim 1 wherein said catalyst is a hydrated mixed metal oxide, at least 30% by weight of the metal therein consisting of aluminum.

12. Process of claim 1 wherein said catalyst is obtained by subjecting amalgamated aluminum to moisture.

13. Process of claim 1 wherein said catalyst is obtained by subjecting an amalgamated aluminum alloy containing at least 30% by weight of aluminum to moisture.

14. Process of claim 1 wherein the polymerization is carried through in the presence of an inert solvent, the catalyst being applied in an amount of 0.5–10% as calculated on the weight of monomeric formaldehyde.

References Cited in the file of this patent

UNITED STATES PATENTS 2,519,550    Craven _____ Aug. 22, 1950

OTHER REFERENCES

Walker: Formaldehyde, A.C.S. Monograph #120 (1953), p. 179.